(12) United States Patent
Burns (10) Patent No.: US 10,752,454 B2
(45) Date of Patent: Aug. 25, 2020

(54) DEBRIS CARTS AND SYSTEMS AND METHODS OF USING SAME

(71) Applicant: RICHARD S. BURNS & COMPANY, INC., Philadelphia, PA (US)

(72) Inventor: Allen T. Burns, Philadelphia, PA (US)

(73) Assignee: RICHARD S. BURNS & COMPANY, INC., Philadelphia, PA (US)

( * ) Notice: Subject to any disclaimer, the term of this patent is extended or adjusted under 35 U.S.C. 154(b) by 300 days.

(21) Appl. No.: 15/099,345

(22) Filed: Apr. 14, 2016

(65) Prior Publication Data

US 2017/0297836 A1    Oct. 19, 2017

(51) Int. Cl.
| B65G 67/46 | (2006.01) |
| B62B 3/00 | (2006.01) |
| B62B 3/16 | (2006.01) |
| B65G 47/16 | (2006.01) |

(52) U.S. Cl.
CPC ............. *B65G 67/46* (2013.01); *B62B 3/005* (2013.01); *B62B 3/16* (2013.01); *B65G 47/16* (2013.01)

(58) Field of Classification Search
USPC ..................................... 414/376, 222.1, 373
See application file for complete search history.

(56) References Cited

U.S. PATENT DOCUMENTS

| D202,493 S | 10/1965 | Gribbens |
| 3,366,397 A | 1/1968 | Zeilstra |
| 3,788,702 A | 1/1974 | Toboll |
| 3,797,878 A | 3/1974 | Fagre et al. |
| 3,858,939 A | 1/1975 | Bond et al. |
| 3,888,351 A | 6/1975 | Wilson |
| D240,614 S | 7/1976 | Paterno |
| 4,054,301 A | 10/1977 | Bond et al. |
| 4,129,314 A | 12/1978 | Bond et al. |
| 4,162,086 A | 7/1979 | Bond et al. |
| 4,723,887 A | 2/1988 | Swain |
| D301,651 S | 6/1989 | Rinkewich |
| 4,872,801 A | 10/1989 | Yeazel et al. |
| 5,000,641 A | 3/1991 | Kikuchi et al. |

(Continued)

FOREIGN PATENT DOCUMENTS

| CA | 170988 A | 7/1916 |
| CA | 170989 A | 7/1916 |

(Continued)

OTHER PUBLICATIONS

U.S. Appl. No. 15/487,149 (2017/0297837), filed Apr. 13, 2017 (Oct. 19, 2017), Allen T. Burns (Richard S. Burns & Company, Inc.).

(Continued)

*Primary Examiner* — Saul Rodriguez
*Assistant Examiner* — Willie Berry, Jr.
(74) *Attorney, Agent, or Firm* — Ballard Spahr LLP (57) ABSTRACT

Systems and methods for processing debris from job sites are disclosed. Carts for receiving the debris are also disclosed. Each cart has a base, a plurality of wheels extending downwardly from the base relative to a vertical axis, and a plurality of walls extending upwardly from the base. The walls and the base of each cart cooperate to define a debris-receiving space. The carts can be engaged by a lifting apparatus that rotates along an arcuate path to position the carts in an unloading position.

19 Claims, 8 Drawing Sheets

(56) References Cited

U.S. PATENT DOCUMENTS

| | | | |
|---|---|---|---|
| D326,171 S | 5/1992 | Brenner et al. | |
| D326,198 S | 5/1992 | Pacetti et al. | |
| 5,213,367 A | 5/1993 | Norman, Jr. et al. | |
| 5,297,911 A | 3/1994 | Powell | |
| D362,102 S | 9/1995 | Campbell et al. | |
| D375,470 S | 11/1996 | Adams | |
| 5,618,155 A | 4/1997 | Tighe | |
| D411,044 S | 6/1999 | Maddux et al. | |
| 6,447,235 B1 | 9/2002 | Galeazzi et al. | |
| D527,856 S | 9/2006 | Tropepe | |
| 7,232,136 B2 | 6/2007 | Sheehan | |
| D577,171 S | 9/2008 | Moore | |
| D620,220 S | 7/2010 | Hsu | |
| D637,114 S | 5/2011 | Ries | |
| 8,308,173 B2 | 11/2012 | Pazhoor | |
| D678,127 S | 3/2013 | Markham | |
| D711,613 S | 8/2014 | Brenner | |
| 8,833,580 B2 | 9/2014 | Rogers | |
| D743,190 S | 11/2015 | Franck et al. | |
| 9,347,821 B1 | 5/2016 | Mullaney | |
| D821,675 S | 6/2018 | Burns et al. | |
| D822,932 S | 7/2018 | Burns et al. | |
| 2003/0031543 A1* | 2/2003 | Elbrink | B65F 3/00 414/408 |
| 2005/0140104 A1 | 6/2005 | Pan et al. | |
| 2009/0315210 A1 | 12/2009 | Linares | |
| 2010/0012667 A1 | 1/2010 | Powell | |
| 2011/0068954 A1* | 3/2011 | McQuade et al. | G08G 1/23 340/988 |
| 2012/0242051 A1 | 9/2012 | LaCasse | |
| 2014/0271066 A1* | 9/2014 | Hou | B65F 3/14 414/408 |
| 2017/0297836 A1 | 10/2017 | Burns | |
| 2017/0297837 A1 | 10/2017 | Burns | |

FOREIGN PATENT DOCUMENTS

| | | |
|---|---|---|
| CA | 178072 A | 7/1917 |
| CA | 178073 A | 7/1917 |
| CA | 2964227 A1 | 10/2017 |
| DE | 2510617 A1 | 9/1976 |
| DE | 19524554 A1 | 1/1996 |
| JP | 4416248 B2 | 2/2010 |

OTHER PUBLICATIONS

U.S. Appl. No. 29/561,274, filed Apr. 14, 2016, Burns (Richard S. Burns & Co., Inc.).

U.S. Appl. No. 29/561,277, filed Apr. 14, 2016, Burns (Richard S. Burns & Co., Inc.).

Restriction Requirement dated Jul. 24, 2017 by the U.S. Patent and Trademark Office for U.S. Appl. No. 29/561,274, filed Apr. 14, 2016 (Inventor—Burns et al.; Applicant—Richard S. burns & Company, Inc.) (6 pages).

Response to Restriction Requirement filed on Sep. 12, 2017 by the U.S. Patent and Trademark Office for U.S. Appl. No. 29/561,274, filed Apr. 14, 2016 (Inventor—Burns et al.; Applicant—Richard S. burns & Company, Inc.) (9 pages).

Restriction Requirement dated Jul. 25, 2017 by the U.S. Patent and Trademark Office for U.S. Appl. No. 29/561,277, filed Apr. 14, 2016 (Inventor—Burns et al.; Applicant—Richard S. burns & Company, Inc.) (6 pages).

Response to Restriction Requirement filed on Sep. 12, 2017 by the U.S. Patent and Trademark Office for U.S. Appl. No. 29/561,277, filed Apr. 14, 2016 (Inventor—Burns et al.; Applicant—Richard S. burns & Company, Inc.) (6 pages).

Non Final Rejection was dated Nov. 16, 2017 by the U.S. Patent and Trademark Office for U.S. Appl. No. 29/561,274, filed Apr. 14, 2016 (Inventor—Burns et al.; Applicant—Richard S. burns & Company, Inc.) (7 pages).

Response to Non-Final Office Action filed on Feb. 1, 2018 with the U.S. Patent and Trademark Office for U.S. Appl. No. 29/561,274, filed Apr. 14, 2016 (Inventor—Burns et al.; Applicant—Richard S. burns & Company, Inc.) (7 pages).

Notice of Allowance was dated Mar. 7, 2018 to the U.S. Patent and Trademark Office for U.S. Appl. No. 29/561,274, filed Apr. 14, 2016 (Inventor—Burns et al.; Applicant—Richard S. burns & Company, Inc.) (5 pages).

Issue Notification was dated Jun. 20, 2018 to the U.S. Patent and Trademark Office for U.S. Appl. No. 29/561,274, filed Apr. 14, 2016 (Inventor—Burns et al.; Applicant—Richard S. burns & Company, Inc.) (1 page).

Non Final Rejection was dated Nov. 2, 2017 by the U.S. Patent and Trademark Office for U.S. Appl. No. 29/561,277, filed Apr. 14, 2016 (Inventor—Burns et al.; Applicant—Richard S. burns & Company, Inc.) (7 pages).

Response to Non-Final Office Action filed on Feb. 1, 2018 with the U.S. Patent and Trademark Office for U.S. Appl. No. 29/561,277, filed Apr. 14, 2016 (Inventor—Burns et al.; Applicant—Richard S. burns & Company, Inc.) (7 pages).

Notice of Allowance filed on Mar. 5, 2018 with the U.S. Patent and Trademark Office for U.S. Appl. No. 29/561,277, filed Apr. 14, 2016 (Inventor—Burns et al.; Applicant—Richard S. burns & Company, Inc.) (5 pages).

Issue Notification filed on Jun. 6, 2018 with the U.S. Patent and Trademark Office for U.S. Appl. No. 29/561,277, filed Apr. 14, 2016 (Inventor—Burns et al.; Applicant—Richard S. burns & Company, Inc.) (1 page).

International Search Report and Written Opinion dated Jun. 28, 2018 by the International Searching Authority for International Application No. PCT/US2018/027328, filed on Apr. 12, 2018 (Applicant—Richard S. Burns and Company, Inc.) (19 Pages).

Non Final Rejection dated Mar. 28, 2019 by the U.S. Patent and Trademark Office for U.S. Appl. No. 15/487,149, filed Apr. 13, 2017 (Inventor—Burns et al.; Applicant—Richard S. burns & Company, Inc.) (8 pages).

* cited by examiner

DEBRIS CARTS AND SYSTEMS AND METHODS OF USING SAME

FIELD

This invention relates to carts for receiving debris from a jobsite, as well as systems and methods for using such carts to process debris.

BACKGROUND

Conventional techniques for processing debris generated at a jobsite require that the debris be handled by a large number of workers. Typically, a large dumpster is delivered to a jobsite using a roll-off truck. A large designated area is required for placement, loading, and unloading of the dumpster. Thus, the dumpster typically remains in a fixed location, which is often inconveniently located a long distance from the location where debris is generated or obtained. Consequently, debris is often piled up on ground or floor surfaces to be transported to the dumpster at a later time. Usually, at least two separate handling operations (piling of debris, transport of debris) are required to position the debris in the dumpster. The dumpster typically receives all types of debris from a jobsite and remains open to permit positioning of material within the dumpster at any time. Not surprisingly, such dumpsters are often filled with a wide variety of debris types, making it difficult to separate recyclable materials from other materials. Additionally, because the dumpsters are easily accessible by members of the public, the dumpsters often are filled with non-jobsite waste.

Thus, there is a need for improved systems and methods for processing debris generated at a jobsite. In particular, there is a need for systems and methods that minimize the number of handling operations required to process debris generated at a jobsite. There is a further need for systems and methods that improve the efficiency, reliability, and/or security of debris processing.

SUMMARY

Described herein, in various aspects, is a system for processing debris. The system can have at least one cart, a lifting apparatus, and a first conveyor assembly. Each cart can have a base, a plurality of wheels extending downwardly from the base relative to a vertical axis, and a plurality of walls extending upwardly from the base. The walls and the base of each cart can cooperate to define a debris-receiving space. The lifting apparatus can have at least one arm assembly configured to engage a portion of the base of a respective cart of the at least one cart when the cart is in a resting position. Following engagement between the at least one arm assembly and the cart, the at least one arm assembly of the lifting apparatus can be selectively rotatable relative to a rotational axis to move the cart about and between the resting position and an unloading position. The cart can reach the unloading position following rotational movement of the at least one arm assembly of the lifting apparatus along an arcuate path having an arc length ranging from about 130 degrees to about 170 degrees. The first conveyor assembly can be configured to receive debris from the at least one cart when the at least one cart is in the unloading position.

Also described herein, in additional aspects, is a method for processing debris. The method can include providing at least one cart to a jobsite, transporting the at least one cart from the jobsite to a debris processing facility, and effecting engagement between at least one arm assembly of a lifting apparatus and a first cart of the at least one cart. Each cart can have a base, a plurality of wheels extending downwardly from the base relative to a vertical axis, and a plurality of walls extending upwardly from the base. The walls and the base of each cart can cooperate to define a debris-receiving space. The debris processing facility can include a lifting apparatus and a first conveyor assembly. Following engagement between the at least one arm assembly and the first cart, the method can include selectively rotating the at least one arm assembly of the lifting apparatus relative to a rotational axis to move the first cart from a resting position to an unloading position. The first cart reaches the unloading position following rotational movement of the at least one arm assembly of the lifting apparatus along an arcuate path having an arc length ranging from about 130 degrees to about 170 degrees. With the first cart in the unloading position, the first conveyor assembly can receive debris exiting the first cart.

In further aspects, described herein is a debris cart having a base, a plurality of wheels extending downwardly from the base relative to a vertical axis, a plurality of walls extending upwardly from the base of the base assembly, and a plurality of receptacles extending downwardly from the base. The plurality of walls cooperate with the base to define a debris-receiving space. The plurality of walls can include opposed front and back walls and opposed first and second side walls. The first and second side walls extend between and are connected to the front and back walls. Each wall of the plurality of walls has a rounded upper edge. The front and back walls have respective outer surfaces. Moving from the respective rounded upper edges of the front and back walls to the base, the outer surfaces of the front and back walls are axially tapered at a first taper angle relative to the vertical axis. The first and second side walls have respective outer surfaces. Moving from the rounded upper edge of each side wall to the base, the outer surfaces of the first and second side walls are axially tapered at a second taper angle relative to the vertical axis. The plurality of receptacles can include: a first set of receptacles having at least one row of receptacles aligned relative to a longitudinal axis extending through the opposed first and second side walls of the cart; and a second set of receptacles having at least one row of receptacles aligned relative to a transverse axis extending through the opposed walls of the cart.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE FIGURES

These and other features of the preferred embodiments of the invention will become more apparent in the detailed description in which reference is made to the appended drawings wherein.

DETAILED DESCRIPTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" comprise plural referents unless the context clearly dictates otherwise. Thus, for example, reference to "an engagement element" can comprise two or more such engagement elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description comprises instances where said event or circumstance occurs and instances where it does not.

The word "or" as used herein means any one member of a particular list and also comprises any combination of members of that list.

Described herein with reference to FIGS. 1-9 are carts, systems, and methods for processing debris. As used herein, the term "debris" refers to any discarded material, including, for example and without limitation, waste materials, rubbish, and the remains of broken down or destroyed materials.

Figure 1:
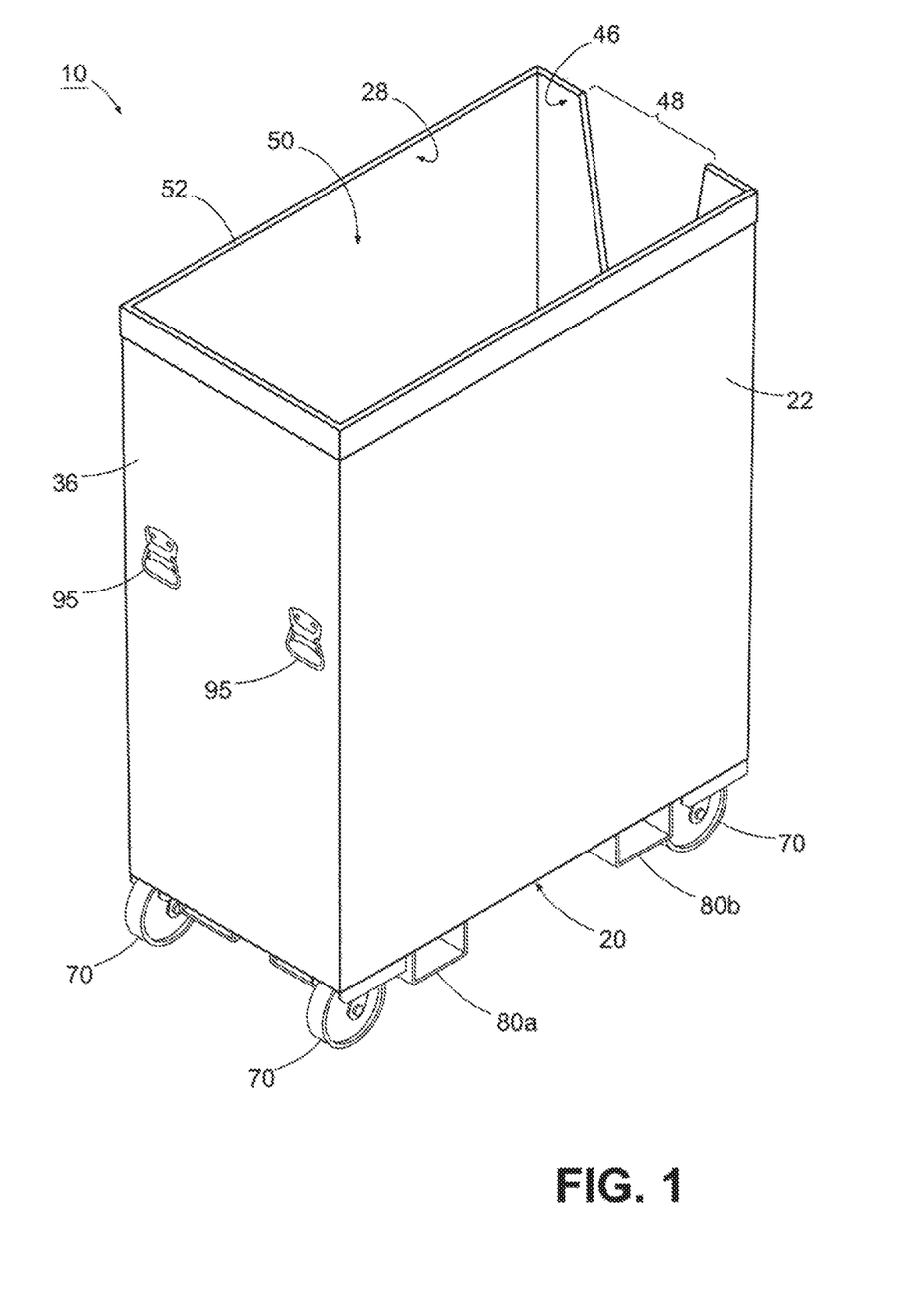
FIG. 1 is a front perspective view of an exemplary cart as disclosed herein.
Figure 2:
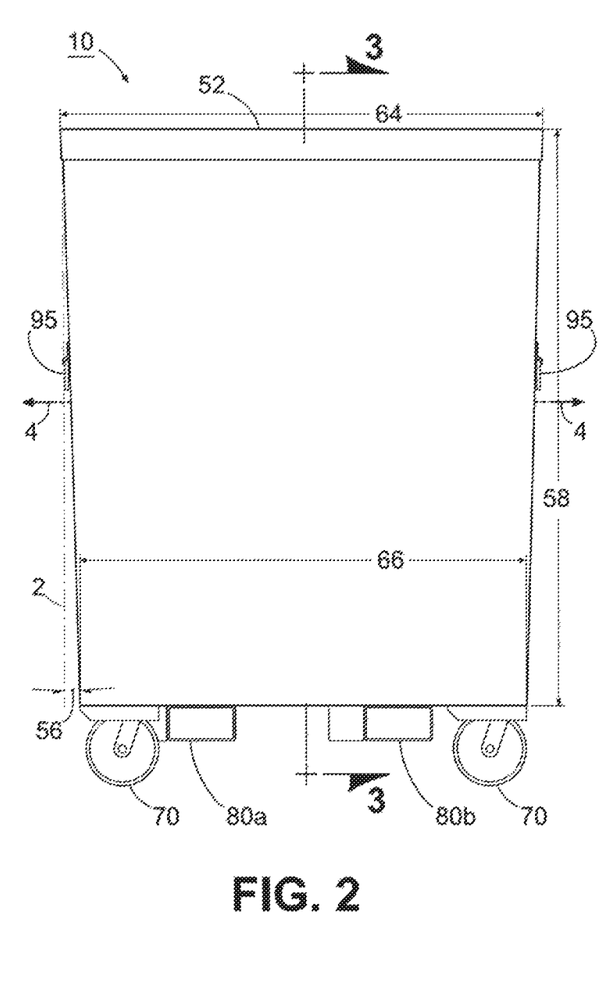
FIG. 2 is a front elevational view of the cart of FIG. 1.

In exemplary aspects, a system 100 for processing debris can comprise at least one cart 10. In these aspects, the cart 10 can have a base 20, a plurality of wheels 70 extending downwardly from the base relative to a vertical axis 12, and a plurality of walls 22, 30, 36, 42 extending upwardly from the base. It is contemplated that the base can optionally have a rectangular shape, although other shapes are possible. The wheels 70 can permit selective movement of the cart 10 to achieve desired positioning and orientation of the cart. Optionally, in exemplary aspects, the wheels 70 can comprise casters as are known in the art. In these aspects, it is contemplated that the plurality of wheels 70 can comprise four casters positioned proximate respective corners of the base 20 as shown in FIGS. 1-6. Optionally, the casters can be polyurethane casters, such as, for example and without limitation, six-inch polyurethane casters as are known in the art. It is contemplated that the use of casters can provide stability to the cart 10 while also making the cart easier to roll and reducing floor markings. In exemplary aspects, the casters can comprise a pair of swivel casters positioned proximate either the first or second side wall and a pair of rigid/fixed casters positioned proximate the other side wall. As shown in FIGS. 1 and 5, the walls 22, 30, 36, 42 and the base 20 of each cart 10 can cooperate to define a debris-receiving space 50. In use, the debris-receiving space 50 can be configured to receive debris as further disclosed herein. Optionally, although not shown, it is contemplated that each cart 10 can be provided with a lid that contains and conceals debris within the cart as the cart is selectively moved around a jobsite or debris processing location. In exemplary aspects, each cart 10 can comprise a lid formed from hard plastic as is known in the art. In further exemplary aspects, each cart 10 can comprise a lid formed from a rimmed lid comprising soft elastic material as is known in the art. It is contemplated that the lid of each cart can comprise a single-piece lid or a plurality of lid portions that are independently moveable and that cooperate to define the lid. In exemplary aspects, it is contemplated that the lid can be pivotally coupled to one of the walls of the cart in a conventional manner (e.g., by a hinge connection). Optionally, in further exemplary aspects, it is contemplated that each cart 10 can be provided with one or more exterior bumper assemblies as are known in the art to reduce and/or eliminate scuffing or damage to walls and other surfaces as the carts are moved throughout a jobsite or debris processing location.

Figure 3:
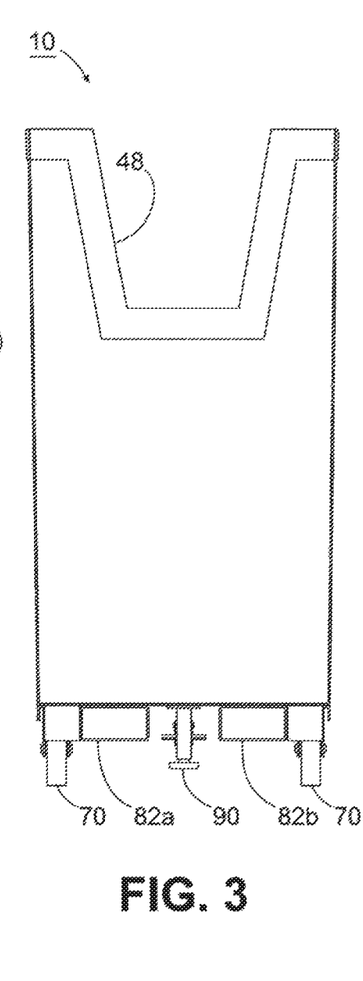
FIG. 3 is a cross-sectional side elevational of the cart of FIG. 1, taken at line 3-3.
Figure 4:
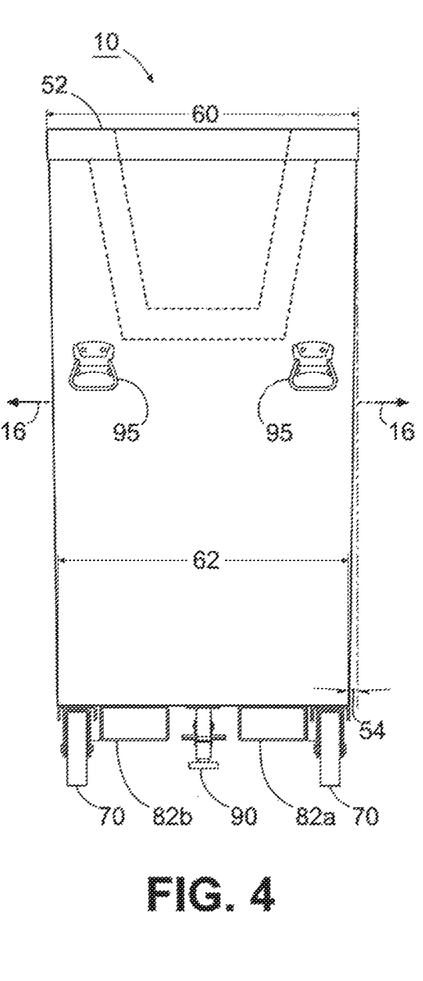
FIG. 4 is a right side elevational view of the cart of FIG. 1.
Figure 5:
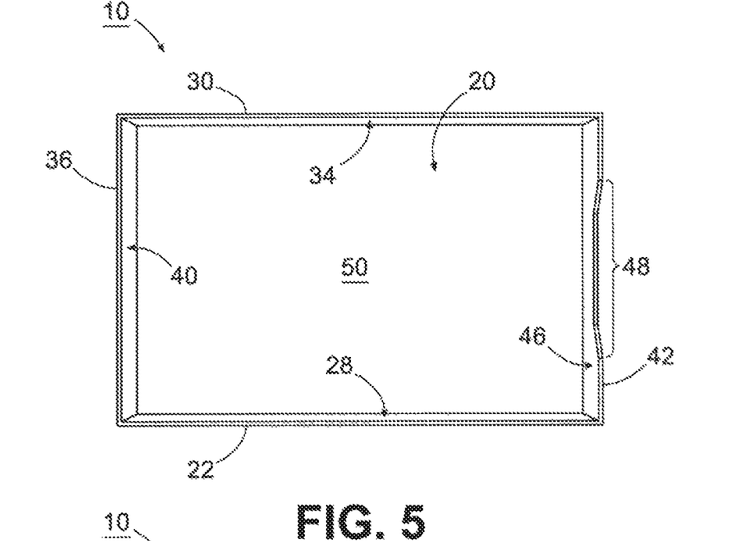
FIG. 5 is a top plan view of the cart of FIG. 1.

In further exemplary aspects, as shown in FIGS. 1-6, the plurality of walls of each cart 10 can comprise opposed front and back walls 22, 30 and opposed first and second side walls 36, 42 that extend between and are connected to the front and back walls. In these aspects, it is contemplated that each wall of the plurality of walls of each debris cart 10 can have a rounded upper edge 52. It is contemplated that the rounded (e.g., capped) edges of each cart 10 can prevent and/or reduce hand or limb injury during use of the cart. In still further exemplary aspects, the front and back walls 22, 30 of each cart have respective outer surfaces 26, 32 and respective inner surfaces 28, 34. In these aspects, as shown in FIG. 4, moving from the respective rounded upper edges 52 of the front and back walls 22, 30 to the base 20 of the cart 10, the outer surfaces 26, 32 of the front and back walls can be axially tapered at a first taper angle 54 relative to the vertical axis 2. In exemplary aspects, it is contemplated that the first taper angle 54 can range from about 0.3 degrees to about 10 degrees, from about 0.4 degrees to about 5 degrees, or from about 0.5 degrees to about 1.5 degrees. In still further exemplary aspects, the first and second side walls 36, 42 can have respective outer surfaces 38, 44 and respective inner surfaces 40, 46. In these aspects, moving from the rounded upper edge 52 of each side wall 36, 42 to the base of the cart 10, the outer surfaces 38, 44 of the first and second side walls can be axially tapered at a second taper angle 56 relative to the vertical axis 2. In exemplary aspects, it is contemplated that the first taper angle 54 can range from about 0.3 degrees to about 10 degrees, from about 0.4 degrees to about 5 degrees, from about 0.5 degrees to about 3 degrees, or from about 0.5 degrees to about 1.5 degrees. In exemplary aspects, the front and back walls 22, 30 of the cart 10 can have a variable length that varies from a first length 64 at a top portion of the cart to a second length 66 at the base 20 of the cart. Optionally, in these aspects, it is contemplated that the first length 64 can range from about 30 inches to about 70 inches, from about 35 inches to about 65 inches, from about 40 inches to about 60 inches, from about 40 inches to about 45 inches, or from about 50 inches to about 60 inches. Optionally, it is contemplated that the first length can be about 55 inches and the second length can be about 53 inches. Alternatively, it is contemplated that the first length can be about 43 inches and the second length can be about 40 inches. In exemplary aspects, the first and second side walls 36, 42 of the cart 10 can have a variable width that varies from a first width 60 at a top portion of the cart to a second width 62 at the base 20 of the cart. Optionally, in these aspects, it is contemplated that the first width 60 can range from about 15 inches to about 45 inches, from about 20 inches to about 40 inches, from about 25 inches to about 35 inches, from about 25 inches to about 30 inches, or from about 30 inches to about 35 inches. Optionally, it is contemplated that the first width can be about 32 inches and the second width can be about 30 inches. Alternatively, it is contemplated that the first width can be about 28 inches and the second width can be about 26 inches. In still further aspects, it is contemplated that the walls of the cart 10 can have a consistent height 58 ranging from about 40 inches to about 60 inches or from about 45 inches to about 55 inches. Optionally, the height 58 can be about 51 inches.

Figure 7:
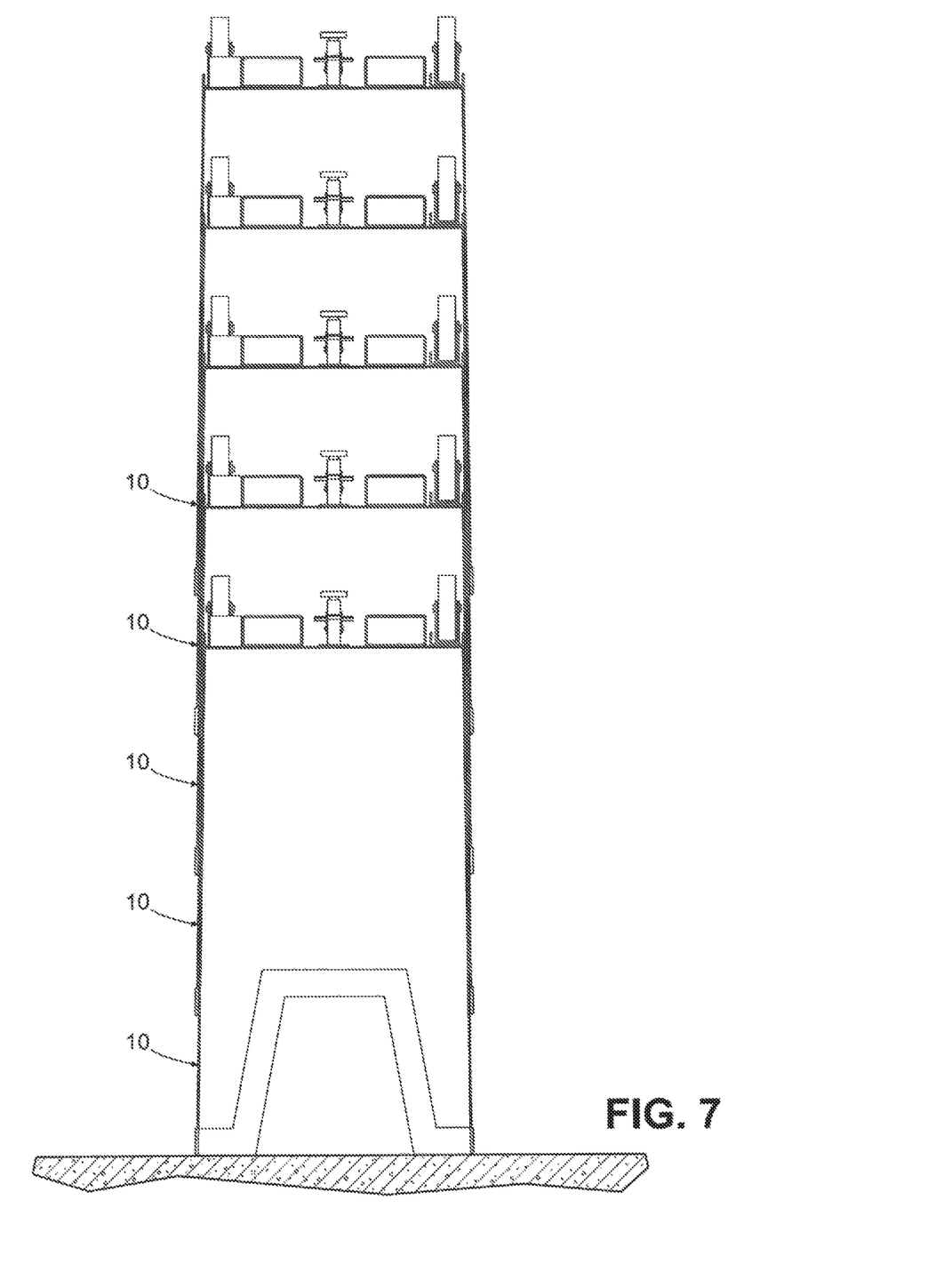
FIG. 7 is a cross-sectional side elevational view of a plurality of carts positioned in a stacked configuration as disclosed herein.

In use, it is contemplated that the tapering of the walls 22, 30, 36, 42 of the carts 10 disclosed herein can provide for easy release of materials positioned within the debris-receiving space 50. As shown in FIG. 7, it is contemplated that the tapering of the walls 22, 30, 36, 42 of the carts 10 disclosed herein can permit stacking of groups of carts, thereby providing for easy storage and/or transport of the carts while minimizing the amount of space occupied by the carts. Thus, it is contemplated that the tapering of the walls of the carts 10 can serve both an ornamental and a functional purpose.

Optionally, as shown in FIGS. 1-7, at least one of the side walls 36, 42 of the cart 10 can comprise a slot 48 that permits access to material positioned within the debris-receiving space 50 of the cart. In exemplary aspects, the slot can have a substantially trapezoidal shape as shown in FIGS. 1 and 3-4. However, it is contemplated that any shape can be used to form the slot 48. In further exemplary aspects, as shown in FIGS. 1 and 3-4, it is contemplated that the slot can extend downwardly from portions of the rounded upper edge 52 of the cart 10. Alternatively, it is contemplated that the side wall 36, 42 can entirely enclose the slot 48. Optionally, it is contemplated that the slot can be provided with a cover. Optionally, in one aspect, the slot 48 can be defined in the side wall 36, 42 having swivel casters as further disclosed herein.

Figure 6:
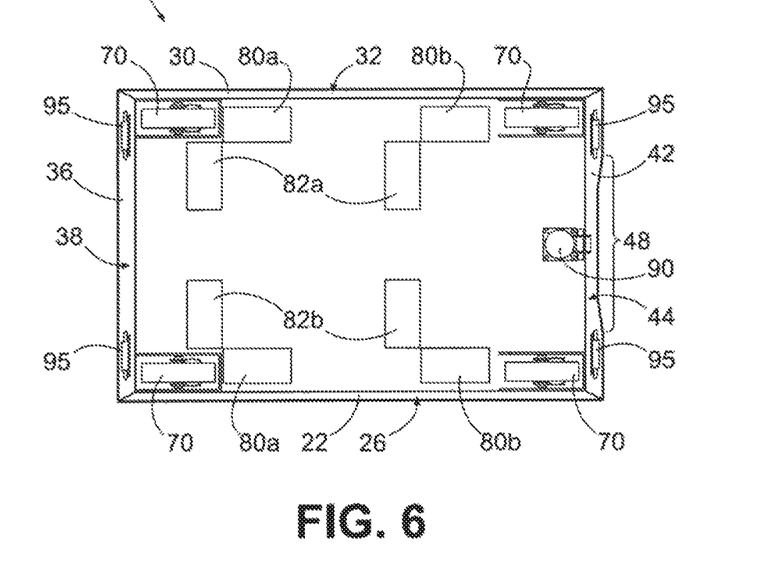
FIG. 6 is a bottom plan view of the cart of FIG. 1.

As shown in FIGS. 1-6, each debris cart 10 can comprise a plurality of receptacles extending downwardly from the base 20. It is contemplated that the receptacles can optionally have a substantially rectangular shape; however, it is contemplated that any shape complementary to the lifting apparatus (e.g., a round shape) can be used. Optionally, in exemplary aspects, the plurality of receptacles can comprise a first set of receptacles 80a, 80b having at least one row of receptacles aligned relative to a longitudinal axis 4 extending through the opposed first and second side walls 36, 42 of the cart and being perpendicular to the vertical axis 2. Optionally, in these aspects, it is contemplated that the plurality of receptacles can further comprise a second set of receptacles 82a, 82b having at least one row of receptacles aligned relative to a transverse axis 16 extending through the opposed front and back walls 22, 30 of the cart and being perpendicular to the vertical axis 2 and the longitudinal axis 4. As shown in FIG. 6, it is contemplated that each set of receptacles can comprise a plurality of rows of aligned receptacles.

In further exemplary aspects, it is contemplated that the cart 10 can comprise at least one floor lock 90, such as a conventional floor lock brake as is known in the art. In these aspects, it is contemplated that the floor lock 90 can extend downwardly from the base 20 and be configured for selective engagement by a worker (for example, by a worker's foot) to activate the floor lock. In exemplary aspects, as shown in FIG. 6, it is contemplated that the floor lock 90 can be positioned between (optionally, centered between) a pair of wheels 70 (e.g., casters) on one side of the cart 10. Optionally, in these aspects, it is contemplated that the wheels 70 can comprise a pair of swivel casters positioned on the same side of the cart as the floor lock 90, thereby permitting optimum control of the cart.

In still further exemplary aspects, the cart 10 can comprise a plurality of folding (e.g., hinged) handles 95 that are secured to at least one side wall 36, 42 of the cart. In these aspects, it is contemplated that the folding handles 95 can permit manual control of the movement of the cart 10, while the folding of the handles ensures that the carts have a reduced profile during transport and stacking (for example, in tight spaces). Optionally, handles 95 can be secured to both side walls 36, 42.

In still further exemplary aspects, each cart can be assigned a unique identifier and provided with indicia of the unique identifier. Exemplary forms of indicia include barcodes, radiofrequency identification (RFID) tags, sensors, and the like. In use, it is contemplated that these forms of indicia can be used to track the location of a particular cart 10 and provide a system controller 160 as further disclosed herein with the ability to associate information with the unique identifier of the cart.

Optionally, in exemplary aspects, it is contemplated that the cart 10 can be constructed entirely from steel, thereby limiting and/or preventing side bulging and mechanical failure. In further exemplary aspects, it is contemplated that the walls of the cart 10 can be seem-welded to prevent and/or minimize liquid escape from the debris-receiving space 50.

Figure 8A:
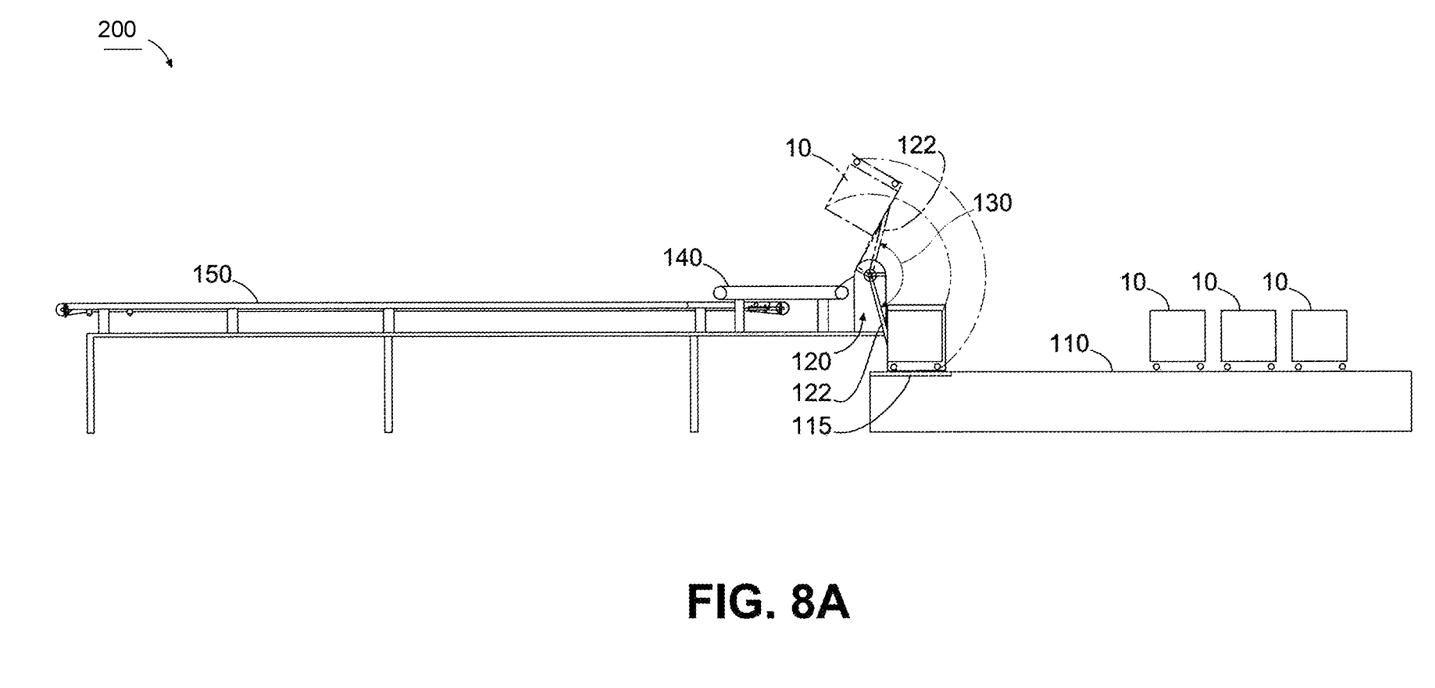
FIG. 8A is a schematic diagram depicting an exemplary debris processing facility as disclosed herein.
Figures 8B, 8C:
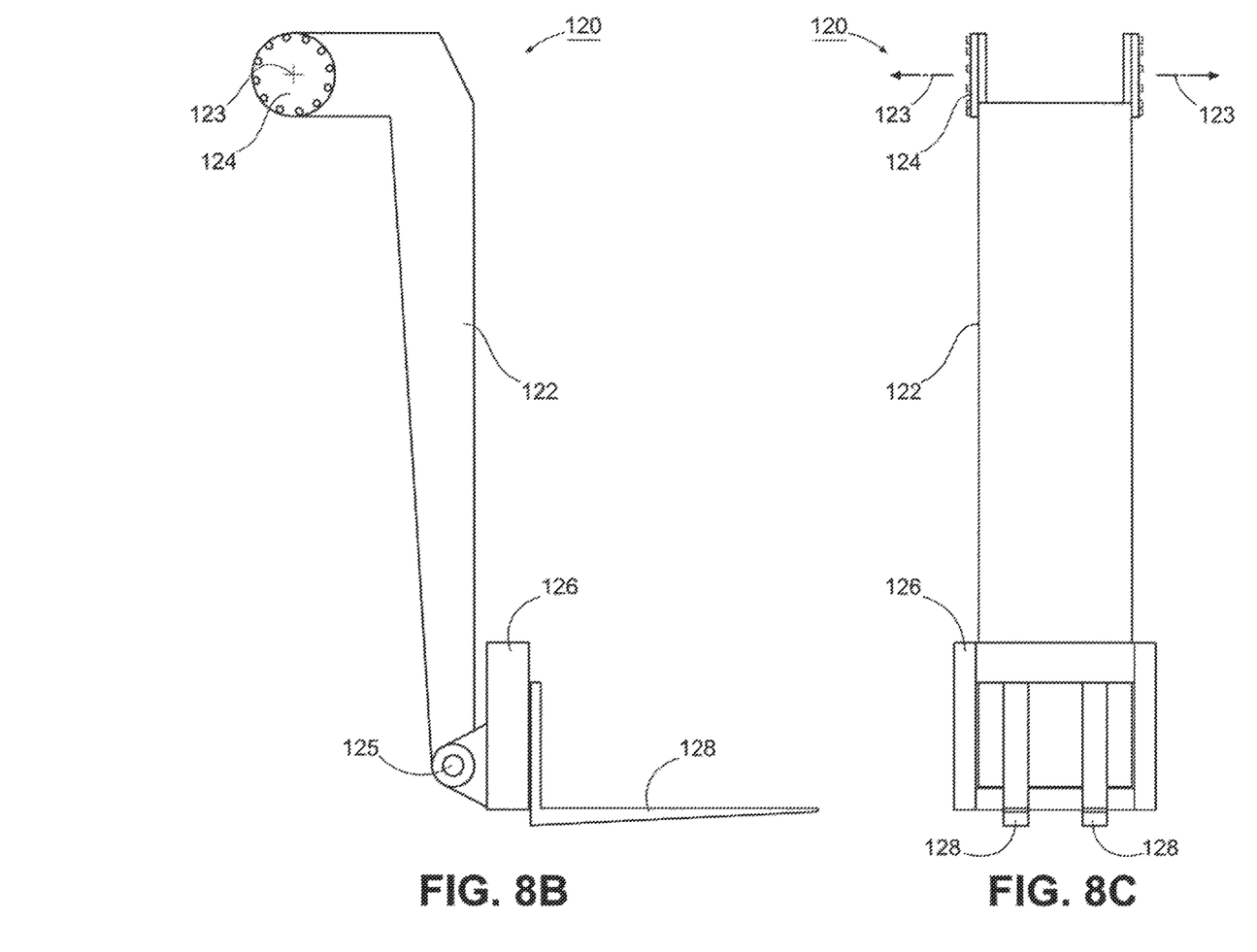
FIG. 8B is a side elevational view of an exemplary lifting apparatus as disclosed herein.
FIG. 8C is a front elevational view of the lifting apparatus of FIG. 8B.

In further aspects, and with reference to FIGS. 8A-8C, the system 100 can further comprise a lifting apparatus 120 having at least one arm assembly configured to engage a portion of the base 20 of a respective cart 10 of the at least one cart when the cart is in a resting position. Optionally, in these aspects, it is contemplated that the resting position can correspond to a position in which the wheels 70 of the cart 10 are resting on a flat surface. Following engagement between the at least one arm assembly and the cart 10, the at least one arm assembly of the lifting apparatus 120 can be selectively rotatable relative to a rotational axis 123 to move the cart about and between the resting position and an unloading position. As shown in FIG. 8A, the cart 10 can reach the unloading position following rotational movement of the at least one arm assembly of the lifting apparatus 120 along an arcuate path having an arc length 130 ranging from about 105 to about 175 degrees and more preferably, from about 130 degrees to about 170 degrees.

In exemplary aspects, the lifting apparatus 120 can comprise an actuator coupled to the at least one arm assembly of the lifting apparatus. In these aspects, the actuator can be configured to effect selective rotational movement of the at least one arm assembly of the lifting apparatus 120. It is contemplated that the actuator can be any conventional actuator that is capable of creating rotational movement of the lifting apparatus 120. In exemplary aspects, it is contemplated that the actuator can be a hydraulic actuator; however it is contemplated that other rotational actuators (e.g., pneumatic, mechanical, or electromechanical actuators) can be used.

In further exemplary aspects, and with reference to FIGS. 8A-8C, each arm assembly of the lifting apparatus 120 can comprise an arm 122 and at least one engagement element 128 coupled to the arm and configured to engage the base 20 of the cart 10. Optionally, in these aspects, it is contemplated that each receptacle 80a, 80b, 82a, 82b of the cart can be configured to receive a corresponding engagement element 128 of the lifting apparatus 120. It is further contemplated that the at least one engagement element 128 can be configured to engage either the first set of receptacles 80a, 80b or the second set of receptacles 82a, 82b of each cart 10 depending upon the orientation of the cart. Thus, it is contemplated that the cart can engage the arm assembly in any orientation (with either the front or back wall facing the arm assembly or one of the side walls facing the arm assembly). In use, each engagement element 128 can extend at least partially within each receptacle of a corresponding set of receptacles. Upon activation of the lifting apparatus, the arm assembly rotates relative to the arcuate path. As shown in FIG. 8A, the engagement elements 128 and the base 20 of the cart 10 are initially positioned in a horizontal (0 degree) orientation. However, following movement of the lifting apparatus to the unloading position, the engagement elements 128 and the base 20 of the cart 10 are positioned at an obtuse angle (corresponding to arc length 128) relative to the ground, with the inner surface of the base 20 (and the debris-receiving space 50) facing the ground, thereby permitting gravity-assisted unloading of debris from the cart.

In exemplary aspects, the at least one engagement element 128 of each arm assembly can be pivotally coupled to the arm 122 of the arm assembly. FIG. 8B depicts an exemplary pivot point 125 where the at least one engagement element 128 can be pivotally coupled to the arm 122, Optionally, in these aspects, the arm assembly can further comprise a mount 126 to which the at least one engagement element 128 is secured (e.g., mounted), and the mount can be pivotally coupled to the arm 122 at the pivot point 125, thereby pivotally coupling the at least one engagement element to the arm. The pivot point 125 can comprise a conventional pivotal connection, such as, for example and without limitation, a pin connection. In use, it is contemplated that the pivotal connection (at pivot point 125) can permit adjustment of the position of the at least one engagement element 128 to provide for optimal positioning of the engagement elements relative to the cart 10. For example, it is contemplated that the mount 126 (and the engagement elements 128) can be rotated at the pivot point 125 to adjust the vertical location of the engagement elements. In still further aspects, the arm 122 can optionally comprise a plurality of openings or slots spaced along the length of the arm, with each opening (or group of aligned openings) being configured to receive a pin to thereby permit adjustment of the location of the pivot point 125 (by allowing for pivotal coupling of the mount 126 at a variety of locations relative to the length of the arm). Optionally, in further aspects, it is contemplated that the at least one engagement element 128 can be configured for selective axial movement relative to the rotational axis 123. In these aspects, it is contemplated that the arm 122 can be slidingly coupled to a pin to permit axial movement of the arm 122 (and consequently, the mount 126 and engagement elements 128) relative to the rotational axis 123. Alternatively, it is contemplated that the mount 126 can be slidingly coupled to a pin secured at a distal portion of the arm 122 to permit axial movement of the mount (and consequently, the engagement elements 128) relative to the rotational axis. Thus, in use, it is contemplated that the pivot point 125 can optionally provide for selective vertical and/or horizontal movement of the at least one engagement element 128, thereby ensuring optimal engagement with a cart 10 as further disclosed herein. Optionally, it is contemplated that one or more actuators can be coupled to the mount, the arm, and/or the engagement elements to effect desired rotational or axial movement of the engagement elements as disclosed herein. Following movement of the at least one engagement element as disclosed herein, it is contemplated that the mount and/or engagement elements can be locked in a desired position relative to the arm using conventional locking mechanisms.

Optionally, it is further contemplated that the engagement elements can be selectively replaceable. For example, it is contemplated that a first engagement element assembly can be detached from the mount and/or arm and replaced with a second engagement element assembly that is more compatible with a given type of cart. In exemplary aspects, it is contemplated that the at least one engagement element can be secured to the mount using conventional fasteners as are known in the art. Alternatively, it is contemplated that the at least one engagement element can be integrally formed with or permanently secured to the mount 126. Optionally, in exemplary aspects, it is contemplated that each engagement element can be independently axially moveable relative to at least one other engagement element. In these aspects, it is contemplated that the engagement elements can be slidingly coupled to a portion of the mount and/or a portion of the arm to permit selective, independent movement of the engagement elements relative to the rotational axis 123. In these aspects, it is further contemplated that individual engagement elements can be selectively axially moved relative to the rotational axis 123 to create desired spacing between the engagement elements, as may be required when carts having varying receptacle configurations are used.

In exemplary aspects, it is contemplated that the at least one engagement element 128 can comprise a plurality of elongate fingers as shown in FIGS. 8B-8C. Optionally, the plurality of elongate fingers can be oriented substantially parallel to one another to define a "fork" configuration. When the cart 10 comprises a plurality of rows of aligned receptacles, it is contemplated that engagement between the plurality of elongate fingers can occur when each finger is received within at least a portion of each receptacle within a corresponding row of receptacles.

In additional aspects, and with reference to FIG. 8A, the system 100 can further comprise a first conveyor assembly 140 configured to receive debris from the at least one cart 10 when the at least one cart is in the unloading position. Optionally, in various exemplary aspects, the system 100 can still further comprise a second conveyor assembly 150. In these aspects, the second conveyor assembly 150 can be positioned downstream of the first conveyor assembly 140 such that the first conveyor assembly 140 is configured to deliver debris to the second conveyor assembly at a selectively adjustable rate.

In exemplary aspects, the disclosed system can be used in a method for processing debris. In one aspect, the method can comprise providing at least one cart to a jobsite. In another aspect, and as shown in FIG. 8A, the method can comprise transporting the at least one cart from the jobsite to a debris processing facility 200. In this aspect, it is contemplated that the debris processing facility 200 can comprise a lifting apparatus and a first conveyor assembly as disclosed herein. In a further aspect, the method can comprise effecting engagement between at least one arm assembly of a lifting apparatus and a first cart of the at least one cart. In another aspect, following engagement between the at least one arm assembly and the first cart, the method can further comprise selectively rotating the at least one arm assembly of the lifting apparatus relative to a rotational axis to move the first cart from a resting position to an unloading position as disclosed herein. Optionally, when an actuator is coupled to the at least one arm assembly of the lifting apparatus, and the actuator can effect the selective rotational movement of the at least one arm assembly of the lifting apparatus. In a further aspect, with the first cart in the unloading position, the first conveyor assembly receives debris exiting the first cart. In still another aspect, the method can further comprise selectively adjusting a speed of the first conveyor assembly to deliver debris to a second conveyor assembly at a desired rate.

In an additional aspect, the method can further comprise returning the first cart to the resting position after debris is unloaded from the first cart onto the first conveyor assembly. In another aspect, the method can further comprise disengaging the first cart from the lifting apparatus and effecting engagement between at least one arm assembly of the lifting apparatus and a second cart of the at least one cart. In a further aspect, following engagement between the at least one arm assembly and the second cart, the method can further comprise selectively rotating the at least one arm assembly of the lifting apparatus relative to the rotational axis to move the second cart from the resting position to the unloading position.

In exemplary aspects, when the at least one arm assembly comprises at least one engagement element as disclosed herein, it is contemplated that the at least one engagement element can engage the base of the first cart to effect engagement between the at least one arm assembly and the first cart. In these aspects, it is further contemplated that the at least one engagement element can also effect engagement between additional carts as further disclosed herein.

In further exemplary aspects, when each cart comprises at least one receptacle as disclosed herein, it is contemplated that each engagement element of the lifting apparatus can be received within a corresponding receptacle of a respective cart (e.g., the first cart) to effect engagement between the at least one arm assembly and the cart. In still further exemplary aspects, when the at least one receptacle of each cart comprises first and second sets of receptacles as disclosed herein, it is contemplated that the at least one engagement element can engage either the first set of receptacles or the second set of receptacles depending upon the orientation of the cart in the resting position.

In additional aspects, the method can further comprise sorting the debris on the second conveyor assembly. In these aspects, it is contemplated that any conventional sorting technique can be employed. Optionally, it is contemplated that the sorting can be performed manually. However, in exemplary aspects, it is contemplated that at least a portion of the sorting can be performed in an automated manner using conventional sorting equipment.

Figure 9:
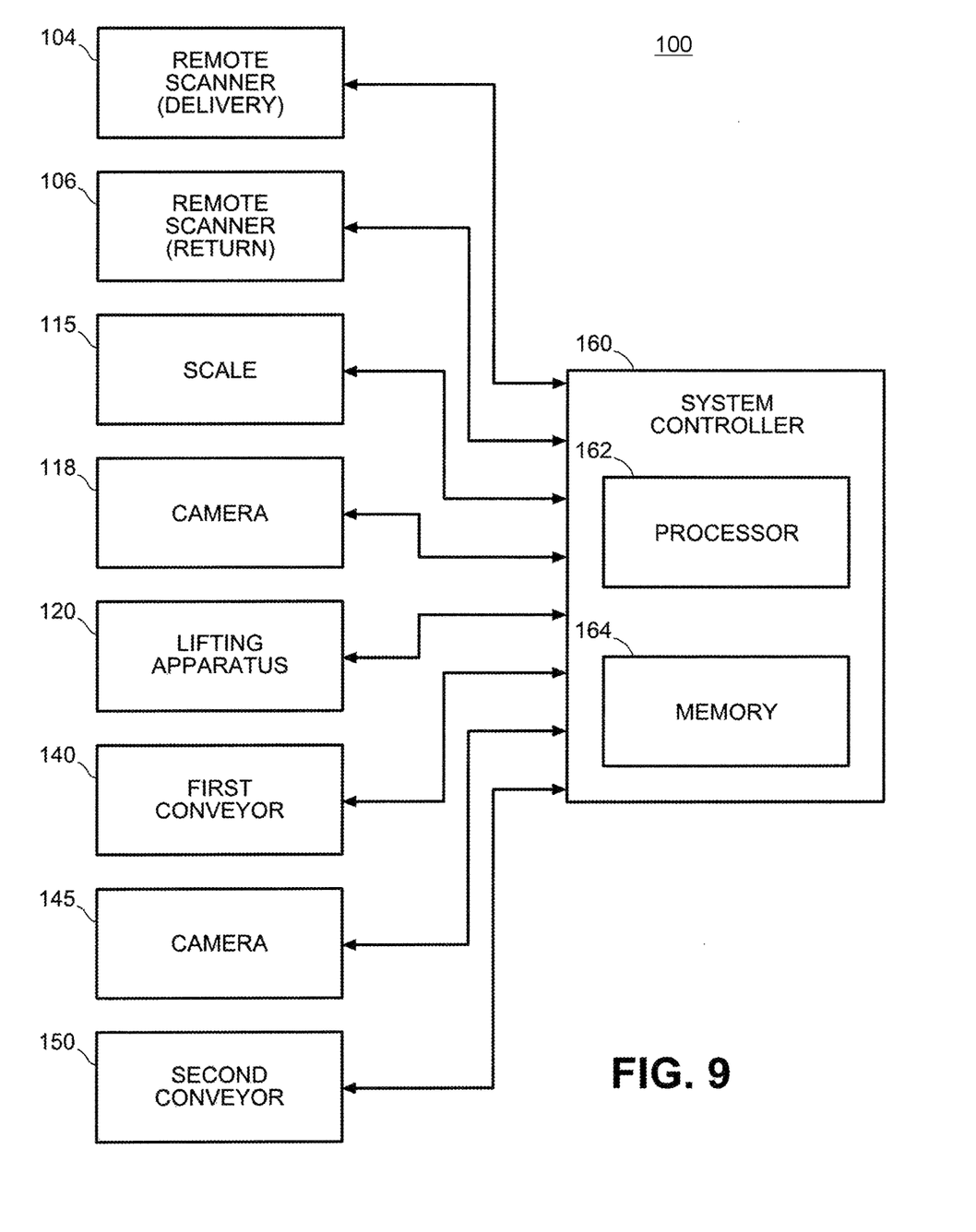
FIG. 9 is a schematic diagram depicting an exemplary system for processing debris as disclosed herein.

In further aspects, when each cart is assigned a unique identifier and provided with indicia of the unique identifier, the method can further comprise detecting the indicia of the unique identifier of the first cart prior to moving the first cart from the resting position to the unloading position. In these aspects, the indicia of the unique identifier can be detected using conventional barcode-scanning equipment (e.g, scanning guns), RFID detection equipment, or optical recognition equipment and/or software. However, it is contemplated that any known scanning and/or detecting device or equipment can be used to detect a complementary form of indicia. In addition to detecting the indicia of the unique identifier of a cart before the cart is moved to the unloading position, it is contemplated that the indicia can be detected at other times and locations throughout the method. For example, as shown in FIG. 9, it is contemplated that a remote scanner 104 can be used to detect (scan) the indicia at the time of delivery of a cart to a given jobsite. It is further contemplated that a remote scanner 106 can be used to detect (scan) the indicia again at the time the cart is returned from a jobsite for subsequent delivery to a debris processing facility 200.

In still further aspects, the method can comprise measuring a weight of the first cart. In these aspects, it is contemplated that the weight of the first cart (and subsequent carts) can be measured before debris is unloaded from the cart, thereby providing for determination of the weight of debris loaded into the cart at the jobsite. In exemplary aspects, the first cart and subsequent carts can be provided to the lifting apparatus on a platform 110 that comprises a scale 115 positioned proximate the lifting apparatus.

In still further aspects, the method can comprise producing an image of the cart prior to positioning of the cart in the unloading position. In these aspects, the image can be produced using a first camera 118 as is known in the art.

In still further aspects, the method can comprise producing an image of debris unloaded from the cart onto the first conveyor assembly. In these aspects, it is contemplated that the image can be produced using the first camera 118 or a second camera 145 as is known in the art.

Optionally, in exemplary aspects, and with reference to FIG. 9, it is contemplated that the system 100 can comprise a system controller 160 having at least one processor 162 and at least one memory 164 in communication with the at least one processor. Exemplary system controllers include computing devices as are known in the art, such as computers, workstations, smartphones, handheld computing devices, programmable logic controllers, and the like. Although shown in FIG. 9 as comprising a single processor 162 and a single memory 164, it is contemplated that the various components of the disclosed system 100 can comprise their own respective processors and/or memories that communicate with the processors and memories of other system components to function as a system controller. In further exemplary aspects, and as shown in FIG. 9, it is contemplated that the system controller 160 can be communicatively coupled (optionally, wirelessly, such as over an Internet or cellular communication network) to various components of the system 100 to receive information and/or control the performance of the system. For example, it is contemplated that the system controller 160 can be communicatively coupled to the remote scanners 104, 106 to receive information regarding a cart (such as location) as the cart is delivered to a jobsite or returned from the jobsite. It is further contemplated that the system controller 160 can be communicatively coupled to the scale 115 to receive information from the scale regarding the weight of a cart. In exemplary aspects, the disclosed methods can comprise transmitting information regarding the weight of the first cart to a system controller as disclosed herein. In these aspects, the method can further comprise using the system controller to associate the measured weight of the first cart with the unique identifier assigned to the cart. It is further contemplated that the system controller 160 can be communicatively coupled to camera 118 and/or camera 145 to receive images obtained by the cameras and/or to control activation of the cameras during the processing of debris as disclosed herein. In exemplary aspects, the disclosed methods can comprise producing an image of the cart and/or an image of the debris provided from the first cart to the first conveyor assembly. In these aspects, the method can further comprise transmitting the image of the cart and/or the image of the debris to the system controller. The method can still further comprise using the system controller to associate the image of the cart and/or the image of the debris with the unique identifier assigned to the cart. It is further contemplated that the system controller 160 can be communicatively coupled to the actuator of the lifting apparatus 120 as disclosed herein. Optionally, the system controller 160 can selectively control the rotation of the lifting apparatus 120 to thereby control the movement of each cart about and between the resting position and the unloading position. Similarly, it is further contemplated that the system controller 160 can be communicatively coupled to the first conveyor assembly 140 and/or the second conveyor assembly 150. Optionally, the system controller 160 can selectively control the speed of one or both of the first and second conveyor assemblies 140, 150. In use, it is contemplated that the memory 164 of the system controller 160 can store data and other information obtained during the processing of debris as disclosed herein. Such data can be retrieved as desired to produce invoices, reports, and other deliverables related to the debris collected in a cart or group of carts as disclosed herein.

Figure 10:
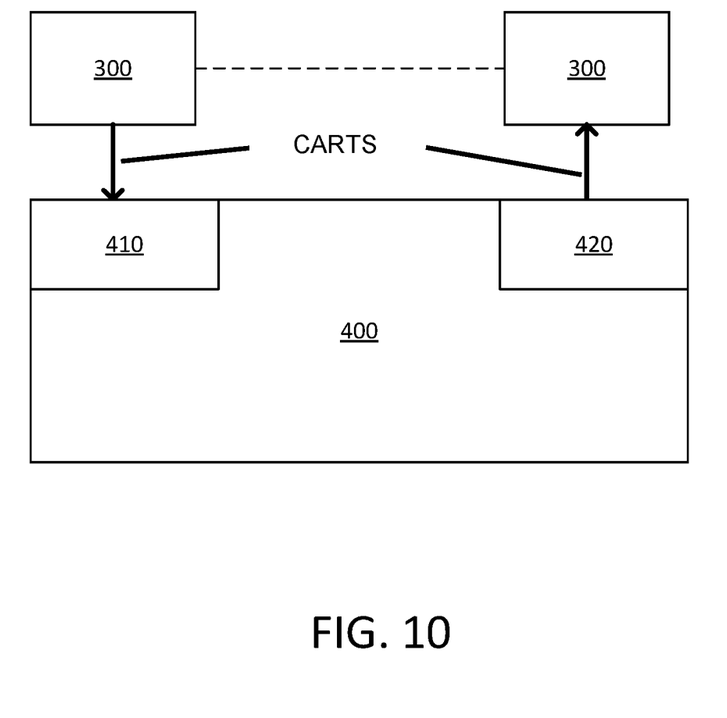
FIG. 10 is a schematic diagram depicting the drop-off and pick-up of carts at a jobsite as disclosed herein.

Thus, in use, it is contemplated that the disclosed systems and methods can provide various advantages in comparison to conventional debris processing techniques. For example, it is contemplated that the disclosed systems and methods can be used to deliver carts to a jobsite via a straight truck with a conventional lift gate, rather than by the roll-off mechanisms typically required for placement of dumpsters. It is further contemplated that the disclosed systems and methods can eliminate the need for a large designed area for loading and placement of a dumpster. Instead, as shown in FIG. 10, carts can be delivered at a variety of locations throughout a jobsite 400, and following delivery, the carts can be selectively dispersed (rolled) throughout the jobsite as required, with minimal effort. In contrast to conventional practices, the disclosed systems and methods allow for placement of debris directly into a cart, regardless of the location of the debris within the jobsite, thereby eliminating the need for piling and "double handling" of debris. With reference to FIG. 10, after debris is collected within a cart, it is contemplated that the cart can be rolled directly to a truck 300 for transport—there is no need for transferring the material from the cart to a dumpster. Due to the flexibility provided by the carts, it is contemplated that the cart retrieval point 420 (where carts are picked up by a truck 300) can be different than the cart delivery point 410 (where carts were first delivered to the jobsite 400). It is still further contemplated that individual carts can be designed for specific materials to thereby produce greater recycling yields; in contrast, current techniques typically require that all materials be placed into a common dumpster. Given the ease with which the disclosed carts can be selectively positioned, it is contemplated that the disclosed systems and methods can provide for greater control over the access to carts, thereby enhancing the security over the content of the carts while limiting or preventing the placement of non-jobsite waste into the carts. It is still further contemplated that the tracking and monitoring systems and disclosed herein can be used to track the specific sources of discarded debris, with carts having been distributed among specialized jobsites.

An Exemplary Process

The following description relates to an exemplary, non-limiting process consistent with the disclosed systems and methods.

Initially, with reference to FIG. 10, an order for at least one cart can be placed for a specific jobsite 400. A dispatch ticket can be created with a unique ticket number. Each cart is provided with indicia associating the cart with the ticket number. The desired number of carts can be scanned and assigned to the jobsite location. The carts can then be delivered to the jobsite 400. Following delivery, the carts can be rolled to desired work areas at the jobsite. Debris materials can be placed into the carts. As described herein, carts can optionally be designated for specific materials, source separating, for higher recycling yield. Full carts can be rolled to a loading dock or other area 420 for pickup, which can occur at a location different than the drop-off location 410. At the time of pick-up, the indicia (barcode/RFID) associated with each cart can be scanned for jobsite identification and inventory tracking. Filled carts can then be brought to the recycling facility. The carts can be rolled from the truck onto a platform and placed in queue for processing. Each cart can be moved onto a scale, which is positioned proximate a lifting apparatus. The lifting apparatus can comprise a hydraulic actuator arm with a fork mechanism. Immediately before the cart lift mechanism begins to operate, the barcode/RFID of the cart is scanned, the cart is weighed, and the cart is photographed. The forks lift the cart in an arcuate path corresponding to an arc length of about 160 degrees. The debris/materials fall from the cart (via gravity) onto a feeder conveyor. The feeder conveyor can meter the materials onto the sorting conveyor line. The cart can be brought back down to the platform and removed manually from the forks. The process can be repeated for each cart. Empty carts can be available for reuse. On the feeder conveyor prior to sorting, the debris/materials can be photographed to document the content of each cart. The recorded data can be joined to the barcode/RFID and jobsite location information. Mechanical sorting and/or hand sorting of the debris can be performed. Materials can be selected based on current market conditions of recyclability and value. The recorded data can then be used for invoicing and recycling report generation.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be comprised within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A method for processing debris, comprising:
receiving an order from a customer for a plurality of carts to be delivered at a jobsite, wherein the order is associated with a unique ticket number, wherein each cart is assigned a unique identifier and provided with indicia of the unique identifier, wherein a system controller associates the unique identifier of each cart of the plurality of carts with the unique ticket number;
loading the plurality of carts onto a truck, each cart of the plurality of carts having a base, a plurality of wheels extending downwardly from the base relative to a vertical axis, and a plurality of walls extending upwardly from the base, wherein the walls and the base of each cart cooperate to define a debris-receiving space;
unloading the plurality of carts from the truck at a jobsite, wherein, following unloading from the truck, the plurality of carts are configured to be rolled to distribute the carts within the jobsite;
following receipt of debris within at least a portion of the plurality of carts and rolling of a plurality of debris-filled carts to a pickup area, delivering the debris-filled carts from the pickup area to a debris processing facility, wherein following delivery, the plurality of debris-filled carts are configured to be rolled within the debris processing facility, the debris processing facility comprising a lifting apparatus and a first conveyor assembly;
effecting engagement between at least one arm assembly of a lifting apparatus and a first cart of the plurality of debris-filled carts; and
following engagement between the at least one arm assembly and the first cart, selectively rotating the at least one arm assembly of the lifting apparatus relative to a rotational axis to move the first cart from a resting position to an unloading position, wherein the first cart reaches the unloading position following rotational movement of the at least one arm assembly of the lifting apparatus, wherein, with the first cart in the unloading position, the first conveyor assembly receives debris exiting the first cart;
detecting the indicia of the unique identifier of the first cart prior to moving the first cart from the resting position to the unloading position;
measuring a weight of the first cart;
transmitting information regarding the weight of the first cart to the system controller;
using the system controller to associate the measured weight of the first cart with the unique identifier assigned to the first cart; and
using the system controller to generate an invoice indicative of at least a weight of debris associated with the unique ticket number.

2. The method of claim 1, wherein an actuator is coupled to the at least one arm assembly of the lifting apparatus, and wherein the actuator effects selective rotational movement of the at least one arm assembly of the lifting apparatus.

3. The method of claim 2, further comprising returning the first cart to the resting position after debris is unloaded from the first cart onto the first conveyor assembly.

4. The method of claim 3, further comprising:
disengaging the first cart from the lifting apparatus;
effecting engagement between at least one arm assembly of the lifting apparatus and a second cart of the plurality of debris-filled carts; and
following engagement between the at least one arm assembly and the second cart, selectively rotating the at least one arm assembly of the lifting apparatus relative to the rotational axis to move the second cart from the resting position to the unloading position.

5. The method of claim 1, wherein each arm assembly of the lifting apparatus comprises:
an arm; and
at least one engagement element coupled to the arm, wherein the at least one engagement element of the arm assembly engages the base of the first cart to effect engagement between the at least one arm assembly and the first cart.

6. The method of claim 5, wherein each cart of the plurality of carts defines at least one receptacle extending downwardly from the base, and wherein each engagement element of the lifting apparatus is received within a corresponding receptacle of the first cart to effect engagement between the at least one arm assembly and the first cart.

7. The method of claim 6, wherein the plurality of walls of each cart of the plurality of carts comprise:
opposed front and back walls; and
opposed first and second side walls, wherein the first and second side walls extend between and are connected to the front and back walls,
wherein the at least one receptacle of each cart comprises:
a first set of receptacles having at least one row of receptacles aligned relative to a longitudinal axis extending through the opposed first and second side walls of the cart; and
a second set of receptacles having at least one row of receptacles aligned relative to a transverse axis extending through the opposed walls of the cart.

8. The method of claim 7, wherein the at least one engagement element engages the first set of receptacles of the first cart to effect engagement between the at least one arm assembly and the first cart.

9. The method of claim 7, wherein the at least one engagement element engages the second set of receptacles of the first cart to effect engagement between the at least one arm assembly and the first cart.

10. The method of claim 1, further comprising selectively adjusting a speed of the first conveyor assembly to deliver debris to a second conveyor assembly at a desired rate.

11. The method of claim 10, further comprising sorting the debris on the second conveyor assembly.

12. The method of claim 1, wherein the truck is a straight truck, and wherein the plurality of carts are loaded and unloaded using a lift gate of the straight truck.

13. The method of claim 1, further comprising:
detecting the indicia of the unique identifier of each cart of the plurality of carts when the carts are unloaded from the truck at the jobsite; and
transmitting, to the system controller, information indicative of delivery of each cart to the jobsite.

14. The method of claim 13, further comprising:
before or during delivery of the debris-filled carts from the jobsite to the debris processing facility, detecting the indicia of the unique identifier of each debris-filled cart of the plurality of debris-filled carts; and
transmitting, to the system controller, information indicative of return of each debris-filled cart from the jobsite.

15. The method of claim 1, further comprising:
producing an image of the debris provided from the first cart to the first conveyor assembly;
transmitting the image of the debris to the system controller; and
using the system controller to associate the image of the debris with the unique identifier assigned to the first cart.

16. The method of claim 1, further comprising:
disengaging the first cart from the lifting apparatus;
detecting the indicia of the unique identifier of a second cart of the plurality of debris-filled carts;
effecting engagement between at least one arm assembly of the lifting apparatus and the second cart;
following engagement between the at least one arm assembly and the second cart, selectively rotating the at least one arm assembly of the lifting apparatus relative to the rotational axis to move the second cart from the resting position to the unloading position;
measuring a weight of the second cart;
transmitting information regarding the weight of the second cart to the system controller; and
using the system controller to associate the measured weight of the second cart with the unique identifier assigned to the second cart,
wherein the invoice generated by the system controller is indicative of at least a total weight of debris of the first and second carts.

17. The method of claim 1, wherein the method does not comprise transferring debris from the plurality of debris-filled carts to a dumpster.

18. The method of claim 1, further comprising using the system controller to generate a report related to at least the weight of debris associated with the unique ticket number.

19. A method for processing debris, comprising:
loading a plurality of carts onto a truck, each cart of the plurality of carts having a base, a plurality of wheels extending downwardly from the base relative to a vertical axis, and a plurality of walls extending upwardly from the base, wherein the walls and the base of each cart cooperate to define a debris-receiving space;
unloading the plurality of carts from the truck at a jobsite, wherein, following unloading from the truck, the plurality of carts are configured to be rolled to distribute the carts within the jobsite;
following receipt of debris within at least a portion of the plurality of carts and rolling of a plurality of debris-filled carts to a pickup area, delivering the debris-filled carts from the pickup area to a debris processing facility, wherein following delivery, the plurality of debris-filled carts are configured to be rolled within the debris processing facility, the debris processing facility comprising a lifting apparatus and a first conveyor assembly;
effecting engagement between at least one arm assembly of a lifting apparatus and a first cart of the plurality of debris-filled carts;
following engagement between the at least one arm assembly and the first cart, selectively rotating the at least one arm assembly of the lifting apparatus relative to a rotational axis to move the first cart from a resting position to an unloading position, wherein the first cart reaches the unloading position following rotational movement of the at least one arm assembly of the lifting apparatus, wherein, with the first cart in the unloading position, the first conveyor assembly receives debris exiting the first cart;
selectively adjusting a speed of the first conveyor assembly to deliver debris to a second conveyor assembly at a desired rate; and
sorting the debris on the second conveyor assembly.

* * * * *